June 12, 1934.  E. E. WEMP  1,962,797
CLUTCH CONSTRUCTION
Filed March 21, 1931  2 Sheets-Sheet 1
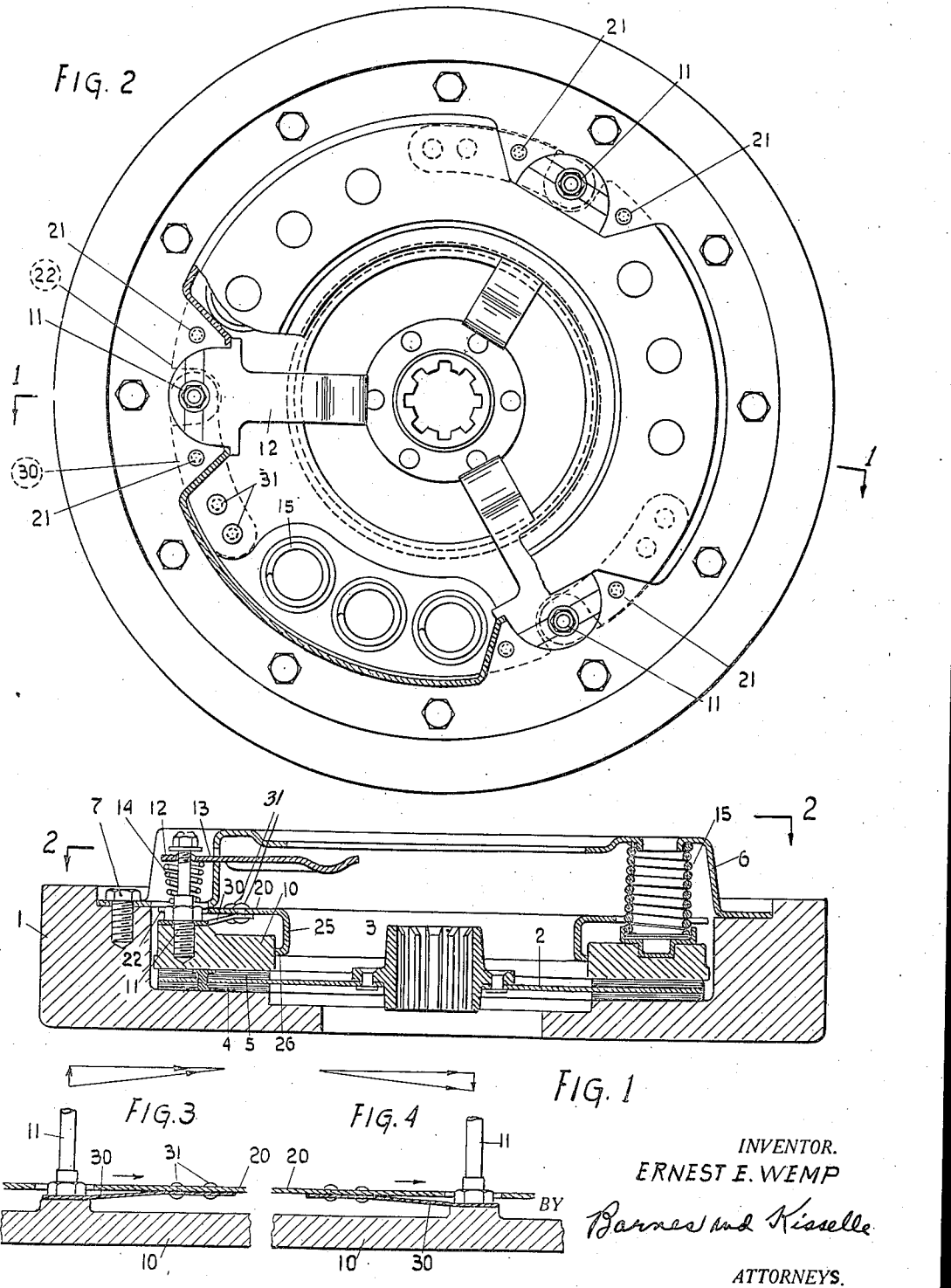
INVENTOR.
ERNEST E. WEMP
BY Barnes and Kisselle
ATTORNEYS.

June 12, 1934.  E. E. WEMP  1,962,797
CLUTCH CONSTRUCTION
Filed March 21, 1931  2 Sheets-Sheet 2
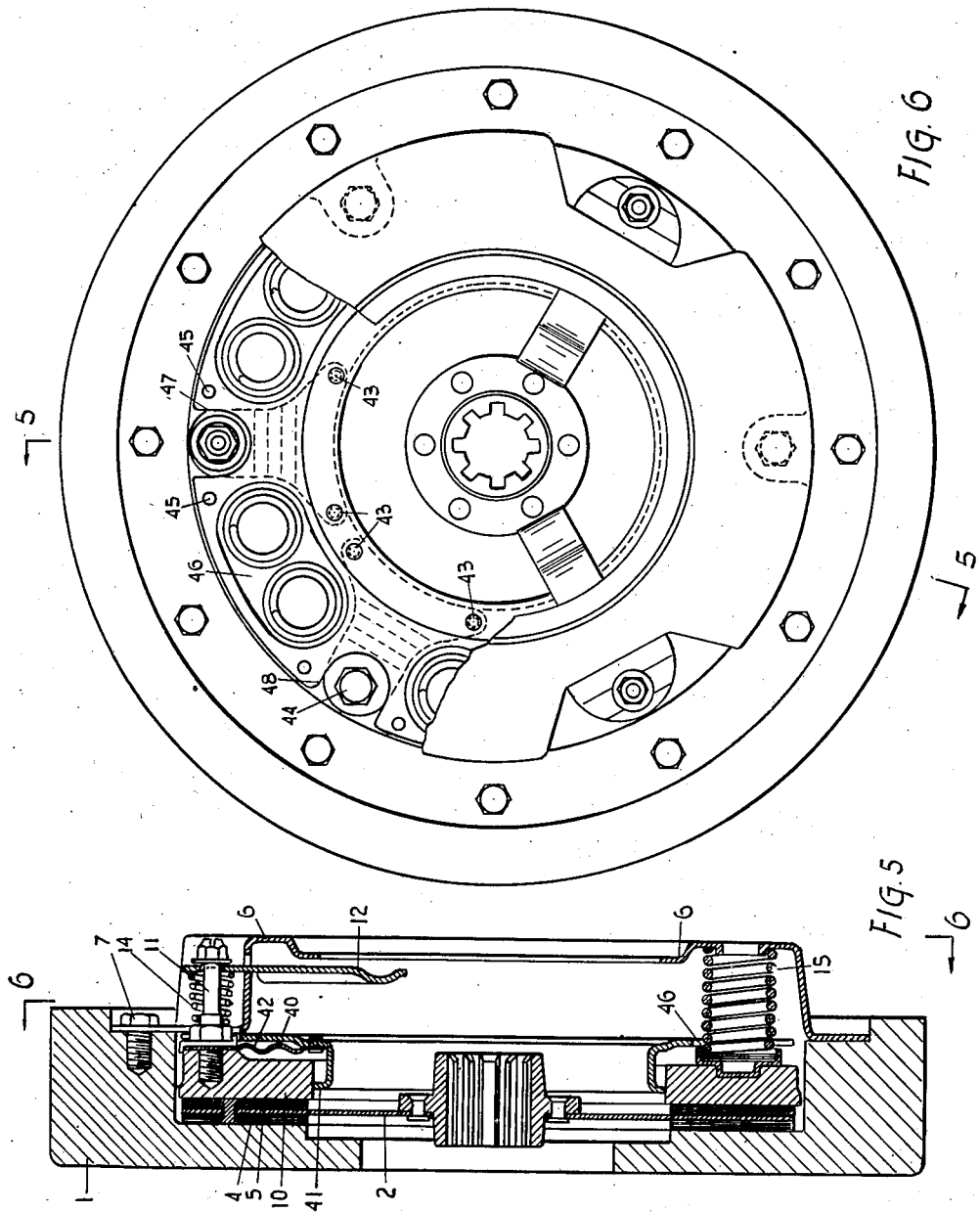
INVENTOR.
ERNEST E. WEMP
BY
Barnes and Kisselle
ATTORNEYS.

Patented June 12, 1934

1,962,797

UNITED STATES PATENT OFFICE 1,962,797

CLUTCH CONSTRUCTION

Ernest E. Wemp, Detroit, Mich.

Application March 21, 1931, Serial No. 524,246

10 Claims. (Cl. 192—68)

This invention has to do with a clutch construction with a special reference to a clutch adapted for use in an automotive vehicle. The invention is concerned particularly with the mounting of a movable clutch element, which is moved relative to other clutching parts for engaging and disengaging the clutch. Such movable element as is depicted herein may be the usual pressure ring or plate movable axially in clutch engaging and disengaging operations. This pressure ring or pressure plate may be a driving member; accordingly, it is connected to other parts for driving it, and these connections, preferably, are of flexible nature to permit of the requisite movement. Provision is made for piloting the ring or plate which advantageously serves to center the same for balancing purposes, and also to permit of its movement. The invention will be better understood and other objects appreciated as the detailed description progresses in connection with the accompanying drawings:

Fig. 1 is a sectional view of a clutch construction in accordance with the invention, the section being taken substantially on line 1—1 of Fig. 2.

Fig. 2 is a partial elevation and section taken on line 2—2 of Fig. 1.

Fig. 3 is a developed view illustrating one type of mounting, also illustrating the force triangle.

Fig. 4 is a view similar to Fig. 3 with its force triangle.

Fig. 5 is a vertical section showing a modified form taken substantially on line 5—5 of Fig. 6.

Fig. 6 is a partial section and elevation taken on line 6—6 of Fig. 5.

The clutch construction may be embodied in the flywheel of an internal combustion engine, such flywheel being shown at 1 and constituting the main driving element. The driven disk is shown at 2 carried by a hub 3 designed to be mounted upon, as by means of the usual spline connection, a driven shaft (not shown) and this driven disk may have clutch facing material 4 and 5.

A clutch cover plate is shown at 6 and it may be mounted to the fly wheel as by means of cap screws 7. The pressure plate or pressure ring is shown at 10. It may be provided with studs 11, the outer ends of which are connected to operating levers 12 which fulcrum on the cover plate as at 13. A coil spring 14 may be used on each stud for holding the levers up against their fulcrum point and effecting a non-rattling installation. Packing springs 15 backed up by the cover plate act upon the pressure ring 10. With reference to Fig. 2, it will be noted that the springs may be arranged in groups between the studs 11 of which there may be three. As will be appreciated by those familiar with the art, the packing springs 15 urge the pressure ring axially so that the facings 4 and 5 are packed between the flywheel and the pressure plate 10 in clutch engagement; to relieve the clutch the pressure ring is retracted as by means of rocking the levers 12 clockwise as viewed in Fig. 1.

The pressure ring is connected to the flywheel so as to serve as a driving member and this connection may be direct or indirect. As shown in the accompanying drawings it is indirectly connected to the flywheel and for this purpose a pilot member 20 is provided. This pilot member may be secured to the cover plate, as by means or rivets or the like 21 which may be located at the sides of the studs 11, and the member 20 is provided with notches 22 for passage of the studs therethrough.

The member 20 has a pilot proper which may be in the form of a flange or the like 25, the extreme end of which may be turned, as at 26, to form the pilot per se for the ring 10. The part 26 may be machined so that a close machined fit is provided with the plate 10. For the purpose of establishing the driving connection for the pressure ring, driving members 30 may be provided which may be steel members of strip like form possessing sufficient springiness or flexibility for the purpose. There may be three of these members, as shown in Fig. 2, each of which may be connected to the pressure ring by means of a stud 11. As shown in Fig. 1, the opposite end of each member may be secured as by means of rivets 31 to the member 20.

In the operation of this clutch construction the parts, when in clutch engagement, appear substantially as shown in Fig. 1. To release the clutch the levers 12 are actuated and the studs 11 retract the pressure ring. This is permitted by flexing the members 30 and by the pressure ring 10 moving axially as regards its pilot. It will be noted that in this movement the center of each stud 11 moves in a slightly arcuate path caused by the member 30 moving in fulcrum-like fashion around its point of fixed attachment to the member 20. This will be more readily appreciated by reference to Fig. 3 wherein it will be noted that if the stud 11 is reciprocated the free end of the member 30 swings around the point of attachment 31 and this swing effects an arcuate path of movement at the point where the free end of member 30 connects to pressure ring 10. This movement is accommodated for by a slight relative rotation between the pressure ring 10 and its pilot so that there is no binding or resisting force. The members 30 of course serve to drive the pressure ring and the arrangement may be such that the members 30 may be either tension or compression members. As shown in Fig. 3 the direction of rotation is from left to right, thus the member 20 pulls the pressure plate 10 with the member 30 acting as the tension member.

The forces are illustrated in the triangle associated with Fig. 3 wherein it will be noted that the component is such as to tend to pull the pressure ring 10 out of packed position thus placing an additional load on the springs 15. In Fig. 4 the direction of rotation is the same as that of Fig. 3 and the member 30 is arranged as a compression member and the component of the force, as illustrated in the triangle associated with Fig. 4, tends to force the pressure ring more tightly in packed relation thus in a measure aiding the packing springs. Either type may be employed as best may seem fitted for any particular installation, and it may here be stated that the component force of the tension member, such as illustrated in Fig. 3, may be easily overcome by the packing springs of requisite strength.

A modified arrangement is shown in Figs. 5 and 6 wherein most of the parts are the same as those shown in Figs. 1 to 4 inclusive, and have the same reference characters applied thereto thus avoiding repetition of description.

A pilot member is shown at 40 which is attached to cover plate 6 and it has a pilot proper 41 for the pressure ring 10. For driving the pressure ring corrugated metal members 42 are provided. These advantageously are sheet steel members connected to the member 40 as by means of rivets 43 and preferably they widen at the base, as shown in Fig. 6. The other or outer ends of these members are connected to the plate 10. There may be three of such members connected to the plate 10 through the means of the studs 11, and between each of these an additional corrugated member similarly connected to the pilot member 40 and each connected to the member 10 by a cap screw or the like 44. The member 40 may be connected to the cover plate as by means of rivets or the like 45, and also provided with cutouts, as illustrated at 46, for accommodating the packing springs. The packing springs in this instance may be arranged in pairs, each pair being located between two corrugated members, as clearly shown in Fig. 6. Member 40 may also have U shaped notches 47 for accommodating studs 11 and also U shaped notches 48 for cap screws 44.

Whereas in the form shown in Figs. 1 to 4 the flexible driving members extend in a circumferential direction thus requiring a slight relative rotation as between the pressure ring and pilot member, the members 42 extend generally radially. The corrugated formation permits lengthening and shortening of the members 42 between the points of attachment 43 to the pilot member, and the points of attachment 11 or 44 to the pressure ring. This permits the points of connection between the members 42 and the pressure ring to move in a straight line as the pressure plate is reciprocated for clutch engagement and disengagement with the shortening and elongating of the corrugated members permitting this movement. It will be appreciated in connection with this that the outer ends of the members 42 tend to swing in an arcuate path as the members are swung around their points of connection 43. Due to their corrugated formation the ends are permitted to move in a straight line path.

The driving members 30 and 42 are not called upon to center the pressure plate 10 as this is accomplished by providing the pilot. The parts may be accurately constructed so that when the pressure ring is placed over the pilot it is balanced and centered and maintained in such condition during operation. The fit between the inner peripheral edge of the pressure plate and the pilot may be relatively close when the installation is made, for at this time the parts are cold. When heat is generated in use the pressure ring is heated to an extent greater than the pilot, as it is the pressure ring that makes direct frictional contact, with the result that metal expansion does not effect a tightening or binding action on the pilot but rather tends in the opposite direction.

I claim:

1. A clutch comprising a driving member, a pressure ring, a driven member, said pressure ring being axially movable to engage and disengage the driven member between the driving member and pressure ring, a pilot carried by the driving member having a portion fitting within the inner peripheral edge of the pressure ring to pilot and center the same, and flexible means connecting the driving member and pressure ring for establishing a driving connection between them and permitting relative axial movement.

2. A clutch comprising a driving member, a pressure ring, a driven member, said pressure ring being axially movable to engage and disengage the driven member between the driving member and pressure ring, a pilot carried by the driving member having a portion fitting within the inner peripheral edge of the pressure ring to pilot and center the same, and flexible sheet steel members connecting the driving member and pressure ring.

3. A clutch comprising a driving member, a pressure ring, a driven member, said pressure ring being axially movable to engage and disengage the driven member to the driving member and pressure ring, a pilot carried by the driving member having a portion fitting within the inner peripheral edge of the pressure ring to pilot and center the same, and circumferentially extending flexible sheet metal members connected respectively to the driving member and pressure ring for establishing a driving connection between them and permitting relative axial movement.

4. In a clutch, a flywheel, a cover plate, a pressure ring, a driven clutch member, a pilot member carried by the cover plate having an axially extending portion over which the pressure ring fits to be piloted and centered thereby, flexible sheet metal driving members connected respectively to the cover plate and pressure ring for establishing a driving connection for the pressure ring, said sheet metal driving members being corrugated whereby the same may extend and contract, means for urging the pressure ring axially to engage the driven member, and means for retracting the pressure plate axially to disengage the driven member, said axial movement being permitted by flexure of said sheet metal driving members.

5. A clutch comprising, a flywheel, a cover plate, a pressure ring, a driven member, means acting on the pressure ring to shift it axially to engage the driven member between the pressure ring and flywheel, a pilot carried by the cover plate having an axially extending part fitting the inner peripheral edge of the pressure ring, means for retracting the pressure plate axially to release the driven member, and circumferentially extending sheet metal members connecting the cover plate and pressure ring for establishing a driving connection for the pressure ring, said members being flexible to permit of the axial movements of the pressure ring.

6. A clutch comprising a driving member, a driven member, a pressure ring, a pilot carried by the driving member fitting the inner peripheral edge of the pressure ring, said pressure ring being axially movable to engage and disengage the driven member, and corrugated sheet metal driving members connecting the driving member and pressure ring for driving the pressure ring.

7. A clutch comprising a driving member, a driven member, a pressure ring, a pilot carried by the driving member fitting the inner peripheral edge of the pressure ring, said pressure ring being axially movable to engage and disengage the driven member, and corrugated sheet metal driving members connecting the driving member and pressure ring for driving the pressure ring, said sheet metal members being flexible to permit of axial movement of the pressure ring in clutch engagement and disengagement.

8. A clutch comprising a driving member, a driven member, a pressure ring, a pilot carried by the driving member fitting the inner peripheral edge of the pressure ring, said pressure ring being axially movable to engage and disengage the driven member, and a plurality of radially extending circumferentially corrugated sheet metal members connecting the driving member and pressure ring for driving the pressure ring.

9. A clutch comprising a driving member, a driven member, a pressure ring, a pilot carried by the driving member fitting the inner peripheral edge of the pressure ring, said pressure ring being axially movable to engage and disengage the driven member, and a plurality of radially extending circumferentially corrugated sheet metal members connecting the driving member and pressure ring for driving the pressure ring, said members being flexible to permit of axial movement of the pressure ring in clutch engagement and disengagement, and extensible and compressible in a direction transverse of the corrugations for variation in length in such movement of the pressure ring.

10. A clutch comprising, a flywheel, a cover plate, an axially movable pressure ring, a driven member engageable between the flywheel and pressure ring, a ring like pilot member carried by the flywheel and having an axially extending pilot member fitting the inner peripheral edge of the pressure ring for piloting and centering the same, a plurality of radially extending sheet metal members secured at their inner ends to the pilot ring, and secured at their outer ends to the pressure ring, said members being flexible and corrugated circumferentially, and a plurality of packing springs circumferentially arranged in groups with each group disposed between next adjacent sheet metal members.

ERNEST E. WEMP.